United States Patent
Stipek et al.

(10) Patent No.: US 8,725,627 B2
(45) Date of Patent: May 13, 2014

(54) MULTIPLE LOAN PAYMENT OPTION SALES TOOL

(75) Inventors: William D. Stipek, Shavano Park, TX (US); Richard Atkinson, San Jose, CA (US); Saleem Buqeileh, San Francisco, CA (US)

(73) Assignee: Wells Fargo Bank, N.A., Charlotte, NC (US)

( * ) Notice: Subject to any disclaimer, the term of this patent is extended or adjusted under 35 U.S.C. 154(b) by 266 days.

(21) Appl. No.: 13/092,872

(22) Filed: Apr. 22, 2011

(65) Prior Publication Data

US 2011/0196781 A1   Aug. 11, 2011

Related U.S. Application Data

(63) Continuation of application No. 12/861,520, filed on Aug. 23, 2010, now Pat. No. 7,953,659, which is a continuation of application No. 12/058,938, filed on Mar. 31, 2008, now Pat. No. 7,805,364.

(60) Provisional application No. 60/975,118, filed on Sep. 25, 2007.

(51) Int. Cl.
*G06Q 40/00* (2012.01)
*G06Q 40/02* (2012.01)
*G06Q 40/04* (2012.01)

(52) U.S. Cl.
USPC ............ 705/38; 705/35; 705/36 R; 705/37; 705/40; 455/3.01; 455/406

(58) Field of Classification Search
USPC ............ 705/35–38, 36 R, 40; 455/3.01, 406; 235/379
See application file for complete search history.

(56) References Cited

U.S. PATENT DOCUMENTS

| | | | | |
|---|---|---|---|---|
| 4,876,648 A * | 10/1989 | Lloyd | | 705/38 |
| 7,765,151 B1 * | 7/2010 | Williams et al. | | 705/38 |
| 2004/0254879 A1 * | 12/2004 | Dickerson | | 705/38 |
| 2005/0097033 A1 * | 5/2005 | Pretell et al. | | 705/38 |
| 2006/0020532 A1 * | 1/2006 | Combs | | 705/35 |
| 2007/0174163 A1 * | 7/2007 | Griffin | | 705/35 |

OTHER PUBLICATIONS

Mortgage.com web pages Feb. 8, 2005.*

* cited by examiner

*Primary Examiner* — Harsih T Dass
(74) *Attorney, Agent, or Firm* — Kegler Brown Hill & Ritter; James J. Pingor

(57) ABSTRACT

A multiple option loan presentation apparatus and method allows a loan agent to communicate a non-traditional loan product to a customer. Non-traditional mortgage products such as pick-a-payment loans allow a borrower to exchange lower payments during an initial period for higher payments later in an amortization period. Some borrowers do not want to accepting the risk associated with adjustable rate mortgages (ARMs) for increases in interest rates, but are still desirous of options for reduced monthly payments. Combining fixed rate loans with an option for interest-only or minimum payments allows this flexibility, but places a premium on being able to graphically depict the implications of these choices. Thereby, the borrower can make an informed decision and the loan agent is able to more quickly conclude the transaction. In particular, the minimum payments constraints and changes in amounts can be made more intuitive.

20 Claims, 5 Drawing Sheets

MULTIPLE LOAN PAYMENT OPTION SALES TOOL

CROSS-REFERENCE TO RELATED APPLICATIONS

This application is a Continuation of U.S. pending patent application Ser. No. 12/861,520 entitled "MULTIPLE LOAN PAYMENT OPTION SALES TOOL" and filed Aug. 23, 2010, which is a continuation of U.S. patent application Ser. No. 12/058,983 entitled "MULTIPLE LOAN PAYMENT OPTION SALES TOOL" and filed Mar. 31, 2008 (now issued as U.S. Pat. No. 7,805,364), which claims the benefit of Provisional Application No. 60/975,118 entitled "FIXED PICK-A-PAYMENT" filed 25 Sep. 2007. The entireties of the above-noted applications are incorporated by reference herein.

FIELD OF THE INVENTION

The present disclosure is generally directed to mortgage application processing. More particularly, the present disclosure is directed to guiding a loan officer and a customer through selection of a mortgage product.

BACKGROUND

Conventionally, mortgage loans are provided at a fixed rate of interest such that payments are made monthly to cover the interest and a portion of the principal calculate to result in repayment within a particular term (e.g., 15 or 30 years). Residential customers are often familiar with such payments. Moreover, the payment schedule can be readily conveyed as a single number that remains constant throughout the term of the loan.

Adjustable rate mortgages (ARM) have garnered a significant amount of the mortgage market by allowing customers to access initial low interest rates, and thus low payments. The mortgage underwriters are able to offer these lower introductory rates due to risk regarding interest rates in the out years has been transferred to the borrower. This risk is often acceptable to the borrower when interest rates are not projected to increase or when the borrower expects to turn over the property in a relatively short period.

A number of loan customers, however, have situations that are not conducive either to a conventional fixed-rate mortgage or for an ARM loan. For instance, the borrower may be risk adverse regarding possible interest rate increases. As another example, the borrower may have cash flow fluctuations from time to time and is desirous of greater flexibility for payment amounts.

SUMMARY

The following presents a simplified summary in order to provide a basic understanding of some aspects of the disclosed versions. This summary is not an extensive overview and is intended to neither identify key or critical elements nor delineate the scope of such versions. Its purpose is to present some concepts of the described versions in a simplified form as a prelude to the more detailed description that is presented later.

In accordance with one or more versions and corresponding disclosure thereof, various aspects are described in connection with an apparatus and method for a multiple loan payment option sales tool that allows a loan agent to readily generate a flexible loan arrangement with selectable payment amounts. The customer still has the benefits of a fixed-rate mortgage by being able to determine what the payments will be, the amount of interest deferred (if any), and the loan balance. In addition, the options are numerically and graphically presented in a manner that is clear and concise, which would otherwise prove daunting to communicate at all.

In one aspect, a method is presented for presenting a multiple option, fixed rate loan. A fixed interest rate, a minimum payment percentage, and a loan term are accessed. Minimum payment amounts in accordance with the minimum payment percentage are calculated. Conventional payment amount in accordance with the fixed interest rate and the loan term are calculated. Minimum payment amounts are graphically depicted to communicate their changing characteristics. In addition, a comparison between the minimum payment amounts and the conventional payment amount are depicted to better communicate the impact of utilizing the minimum payment option that increases the loan balance.

In another aspect, an apparatus is provided for presenting a multiple option, fixed rate loan. A memory component accesses a fixed interest rate, a minimum payment percentage, and a loan term. A loan calculation component calculates minimum payment amounts in accordance with the minimum payment percentage, and calculates conventional payment amount in accordance with the fixed interest rate and the loan term. A user interface graphically depicts the minimum payment amounts, and depicts a comparison between the minimum payment amounts and the conventional payment amount.

In an additional aspect, an apparatus is provided for presenting a multiple option, fixed rate loan, having means for accessing a fixed interest rate, a minimum payment percentage, and a loan term, means for calculating minimum payment amounts in accordance with the minimum payment percentage, means for calculating conventional payment amount in accordance with the fixed interest rate and the loan term, means for graphically depicting the minimum payment amounts, and means for depicting a comparison between the minimum payment amounts and the conventional payment amount.

To the accomplishment of the foregoing and related ends, one or more versions comprise the features hereinafter fully described and particularly pointed out in the claims. The following description and the annexed drawings set forth in detail certain illustrative aspects and are indicative of but a few of the various ways in which the principles of the versions may be employed. Other advantages and novel features will become apparent from the following detailed description when considered in conjunction with the drawings and the disclosed versions are intended to include all such aspects and their equivalents.

DETAILED DESCRIPTION

Figure 1:
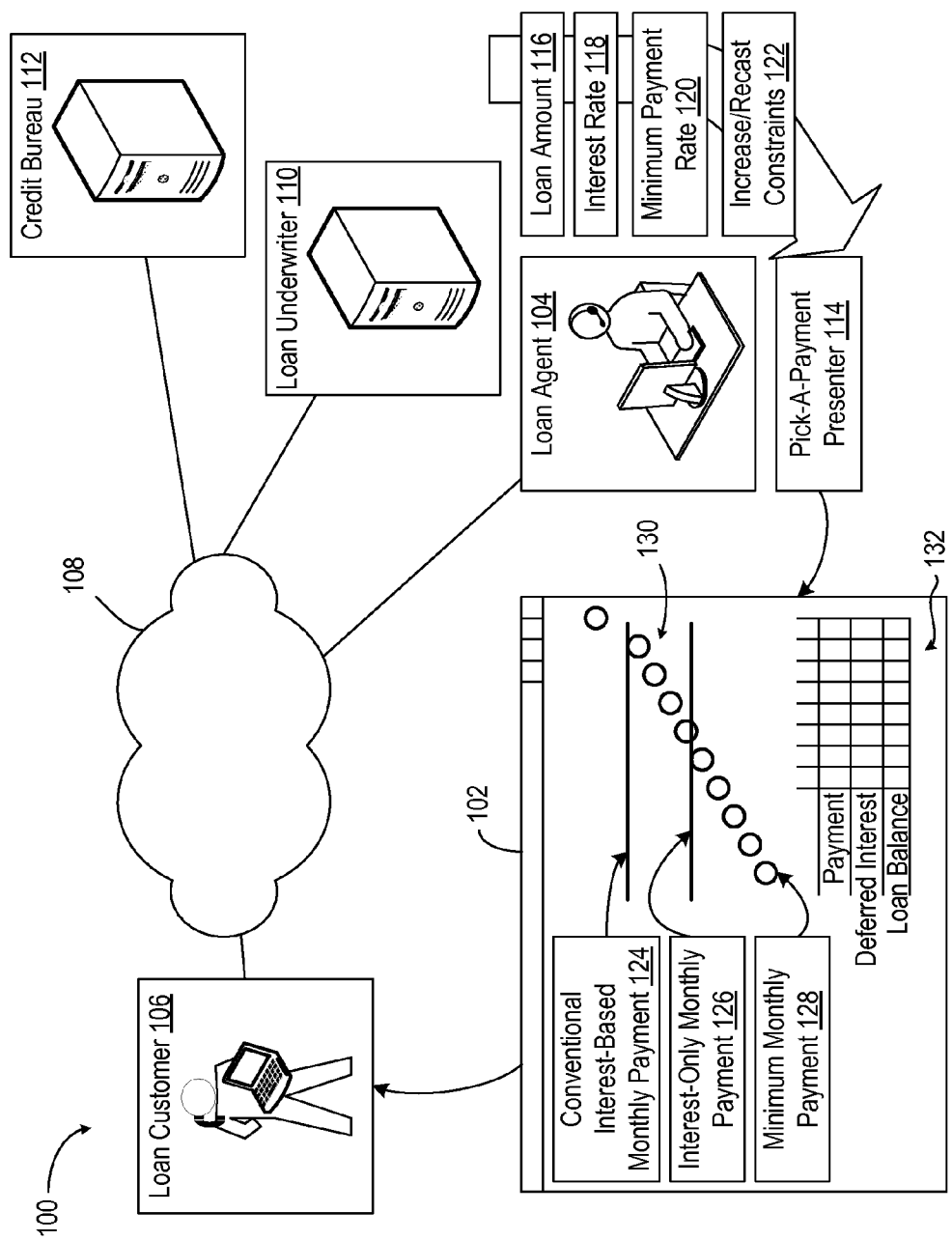
FIG. 1 illustrates a diagram of a multiple option loan presentation system between a loan agent and a loan customer.

A multiple option loan presentation apparatus and method allows a loan agent to communicate a non-traditional loan product to a customer. Non-traditional mortgage products such as pick-a-payment loans allow a borrower to exchange lower payments during an initial period for higher payments layer in an amortization period. Some borrowers do not want to accept the risk associated with adjustable rate mortgages (ARMs) for increases in interest rates, but are still desirous of options for reduced monthly payments. Combining fixed rate loans with an option for interest-only or minimum payments allows this flexibility, but places a premium on being able to graphically depict the implications of these choices. Thereby, the borrower can make an informed decision and the loan agent is able to more quickly conclude the transaction.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a communication system 100 in which an intuitive presentation 102 can be made for multiple payment option non-traditional mortgages can be persuasively and efficiently generated by a loan agent 104 for a loan customer 106. In addition to communicating over a network 108 to a loan underwriter 110 and a credit bureau 112 for approvals and credit information, the loan agent 104 utilizes a pick-a-payment presenter component 114 to create the intuitive presentation 102. In particular, values are accessed or input for loan amount 116, fixed interest rate 118, minimum payment rate 120 and increase/recast constraints 122 for the minimum payment option.

The utility presentation 102 in an illustrative rendering includes calculation results for a conventional interest-based monthly payment, depicted at 124, interest-only monthly payment amount, depicted at 126, and minimum monthly payment for the first time period (e.g., first year), depicted at 128. Due to the negative amortization implications of making minimum payments, the calculations for minimum payments change. Thus the intuitive presentation at 130 depicts graphically and numerically the trend in minimum payment amount. The amount of deferred interest and changes in loan balance can be communicated in a comparison tabulation 132 so the borrower can appreciate how these options differ from a conventional fixed-rate loan.

Figure 2:
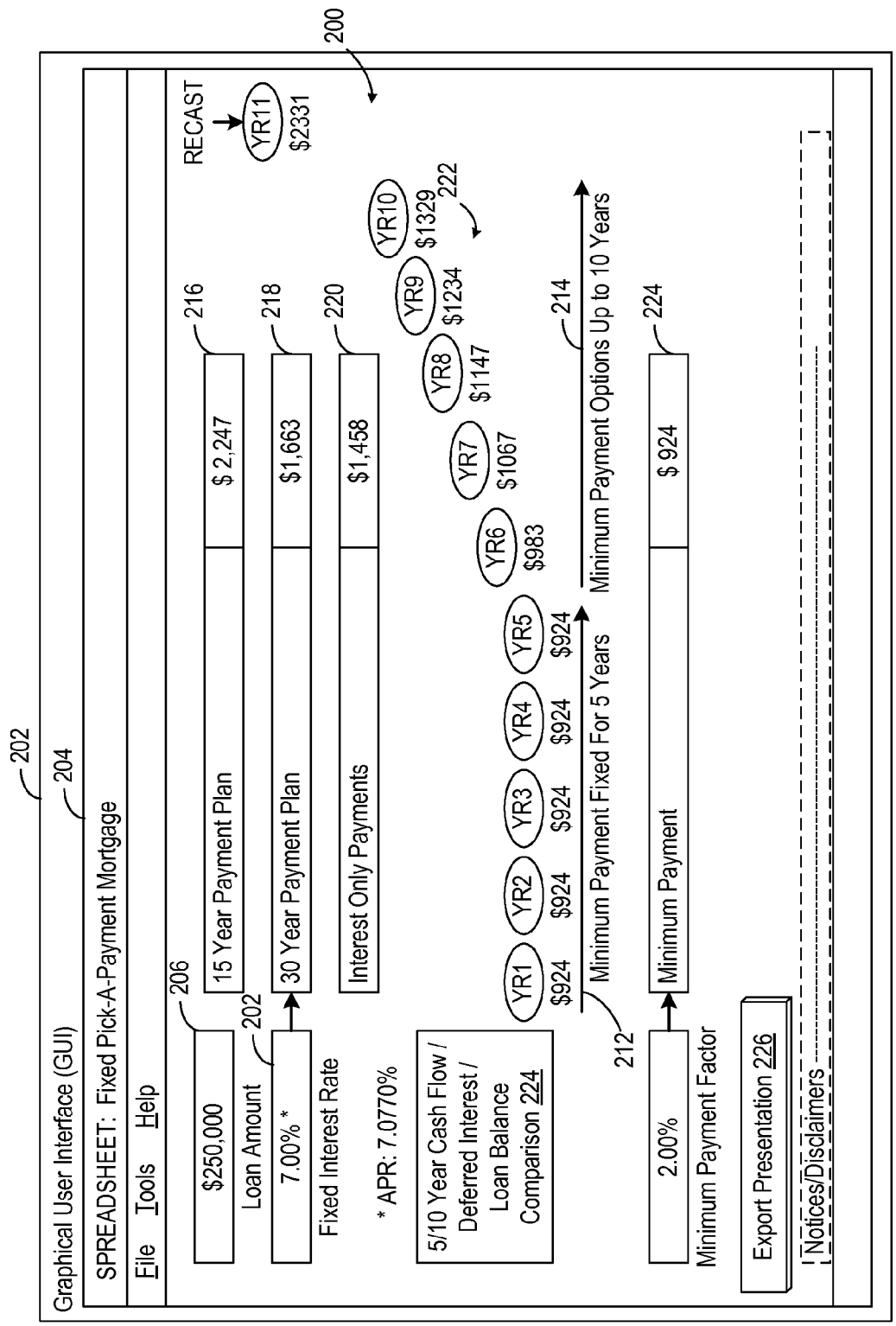
FIG. 2 illustrates a depiction of a multiple option loan user interface and customer handout.

In FIG. 2, an exemplary intuitive presentation 200 is rendered in a graphical user interface (GUI) 202. For example, a web-based program can be executed in a platform independent virtual machine (e.g., JAVA™ environment) or be a spreadsheet program, as depicted at 204. Values for a desired or actual loan amount are depicted at 206 ("$250,000"), for a fixed interest rate at 208 ("7.00%"), and minimum payment factor at 210 ("2.00%"). These values may input into these fields manually, be predefined and merely displayed, or be remotely accessed from another authority. For instance, a currently authorized interest rate could be accessed from an enterprise source.

It should be appreciated with the benefit of the present disclosure that constraints for minimum payments for conciseness are predetermined in this illustrative depiction. A first constraint depicted at 212 is a period of five years in which minimum payments are held constant. A second constraint is a recast period of ten years depicted at 214, after which the minimum payment option changing by having the loan recast to reflect deferred interest. In some applications, selections could be made, such as omitting the five-year period of constant minimum payments or changing the recast period.

It should be appreciated that calculation formulas are hidden that perform the calculations. Such formulas as well known for calculating a fifteen-year conventional monthly payment plan, depicted at 216 ("$2,247"), a thirty-year conventional monthly payment plan, depicted at 218 ("$1,663"), and an interest-only payment, depicted at 220 ("$1,458").

The monthly minimum payments are depicted for each year, both numerically and graphically (i.e., a relative vertical position on the depiction 200 as a plot or graph), depicted at 222 having values of $924, 924, 924, 924, 924, 983, 1067, 1147, 1234, 1329 and 2331 with the current year minimum payment depicted at 224. Tabular information can be depicted on, or accessed from a link depicted at 224 for additional comparison information between the payment options. In the illustrative example, this comparison comprises values at the fifth and tenth years for cash flow (payments made), interest deferred, and loan balance, which can be relative to a 30-year fixed rate loan as a benchmark.

A macro button 226 exports the interactive presentation 200 to a noninteractive presentation for use as a reference or handout.

For conciseness, this example pertains to a new loan. It should be appreciated that such a tool can be an on-going reference for a loan customer who wishes to see the ramifications of various payment options through the life of the life, especially when different options are selected in subsequent payment periods. It should also be appreciated that time period of months and years mentioned are illustrative only and that various time periods can be used.

Figure 3:
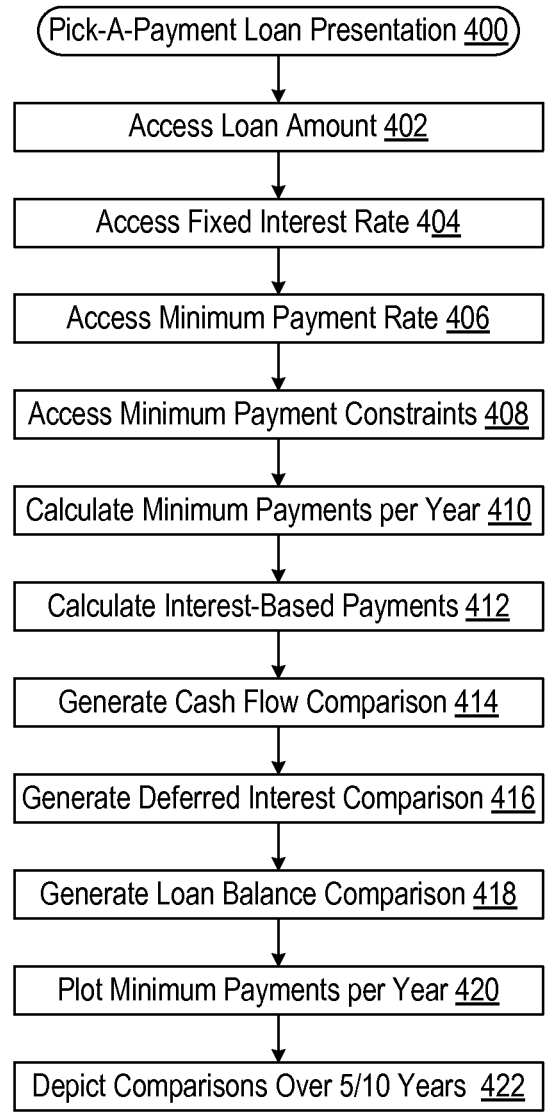
FIG. 3 illustrates a flow diagram of a methodology for pick-a-payment loan presentation.

In FIG. 3, a methodology 400 for pick-a-payment load presentation includes accessing a loan amount (block 202), accessing a fixed interest rate (block 204), a minimum payment rate (block 206), and minimum payment constraints (block 208). Minimum payments per year are calculated in accordance with the minimum payment rate, loan amount, and constraints (block 210). Inter-based payments are also calculated (block 212), which can include multiple term variations and interest-only payment options. In order to compare the implications of selecting various options, a comparison is calculated for cash flow (block 214), for deferred interest (block 216) and loan balance (block 218). Then the minimum payments per year are plotted to intuitive instruct the customer as to the determinative, but changing nature of the payments (block 220). The comparison calculations (e.g., for 5 year and 10 year periods) are also depicted (e.g., table).

Figure 4:
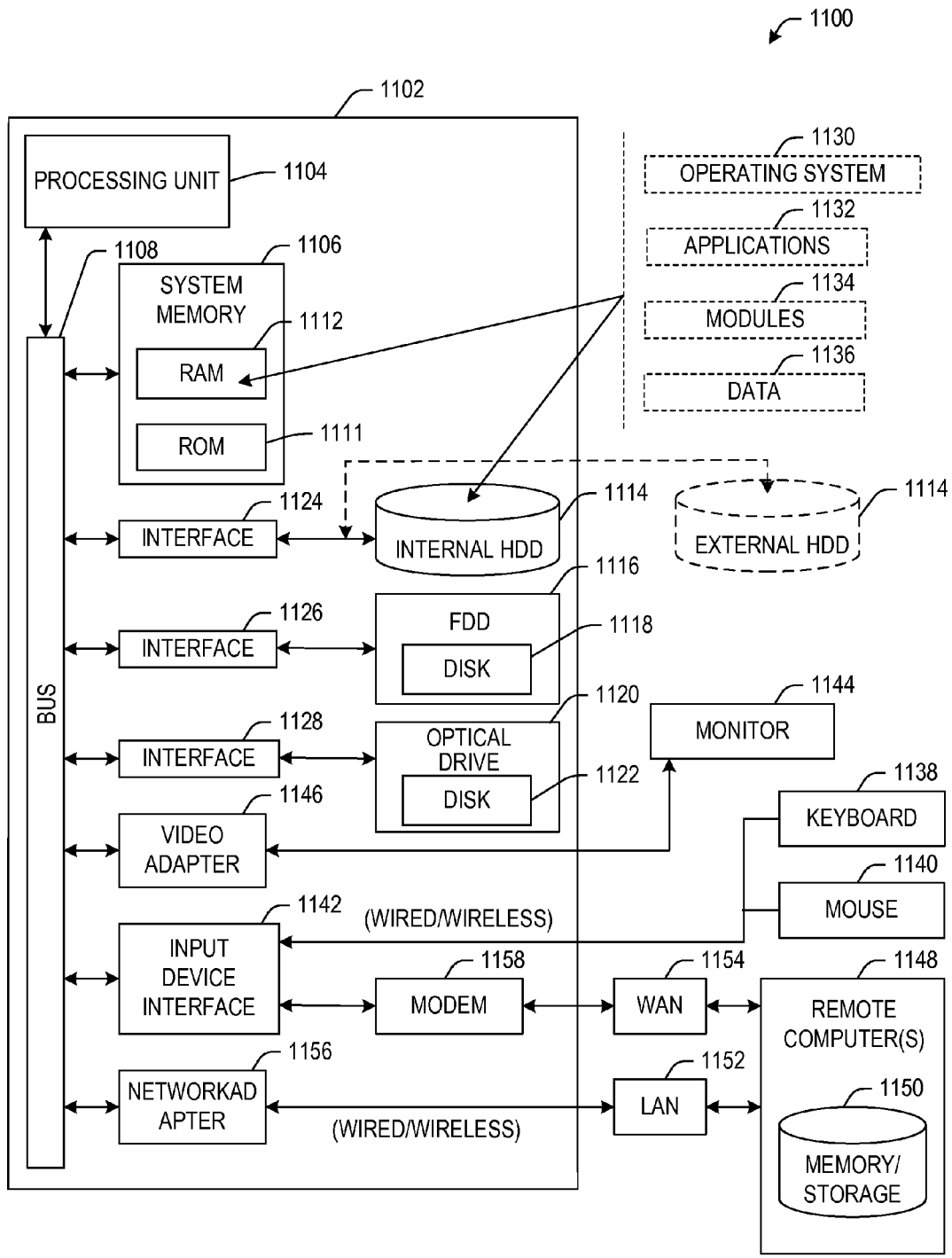
FIG. 4 illustrates a brief general description of a suitable computing environment wherein the various aspects of the subject innovation can be implemented.

Referring now to FIG. 4, there is illustrated a block diagram of a computer operable to execute the disclosed architecture. In order to provide additional context for various aspects of the subject innovation, FIG. 4 and the following discussion are intended to provide a brief, general description of a suitable computing environment 1100 in which the various aspects of the innovation can be implemented. While the innovation has been described above in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 4, the exemplary environment 1100 for implementing various aspects of the innovation includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the innovation.

A number of program modules can be stored in the drives and RAM 912, including an operating system 1130, one or more application programs 1132, other program modules 1134 and program data 1136. All or portions of the operating system, applications, modules, and/or data can also be cached in the RAM 1112. It is appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 5:
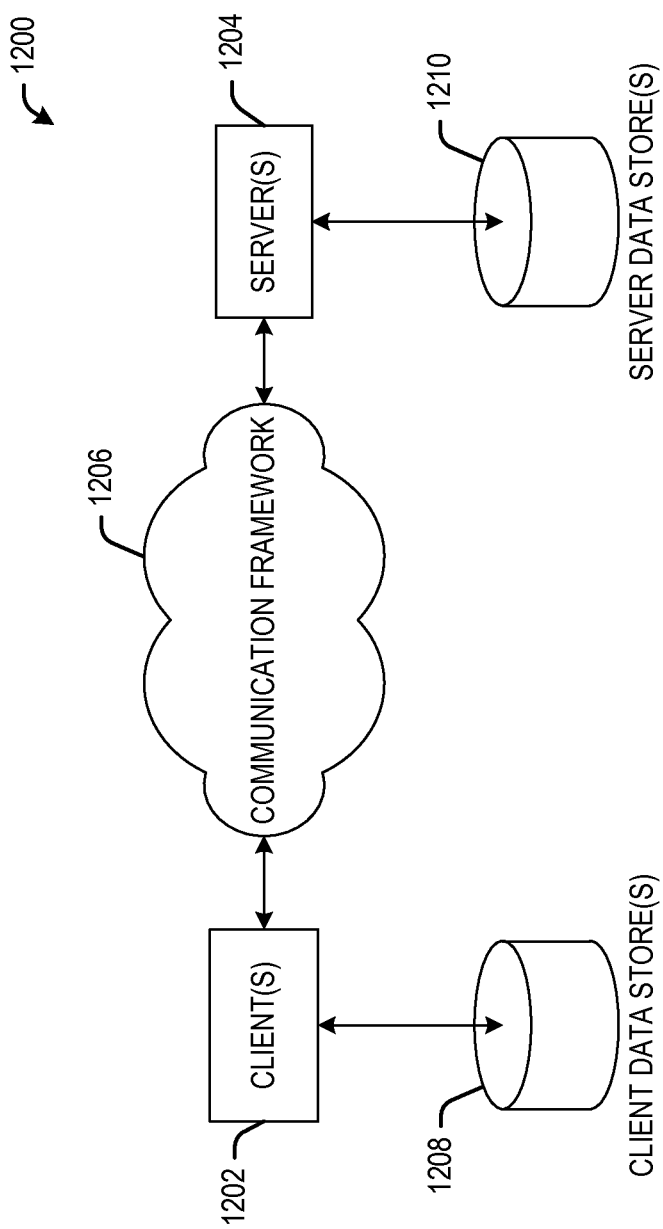
FIG. 5 illustrates a schematic diagram of a client-server computing environment wherein the various aspects of the subject innovation can be implemented.

Referring now to FIG. 5, there is illustrated a schematic block diagram of an exemplary computing environment 1200 in accordance with the subject innovation. The system 1200 includes one or more client(s) 1202. The client(s) 1202 can be hardware and/or software (e.g., threads, processes, computing devices). The client(s) 1202 can house cookie(s) and/or associated contextual information by employing the innovation, for example.

The system 1200 also includes one or more server(s) 1204. The server(s) 1204 can also be hardware and/or software (e.g., threads, processes, computing devices). The servers 1204 can house threads to perform transformations by employing the innovation, for example. One possible communication between a client 1202 and a server 1204 can be in the form of a data packet adapted to be transmitted between two or more computer processes. The data packet can include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method of presenting information associated with a loan with multiple payment options, comprising:
    storing computer executable instructions on a memory;
    employing a processor that executes the computer executable instructions stored on the memory to implement the following acts:
    determining a number of payments per year;
    generating a plurality of distinct loan payment options associated with the loan based at least in part on the number of payments per year;
    exporting the plurality of distinct loan payment options to one or more presentation formats, the one or more presentation formats including at least a comparison tabulation including an amount of deferred interest and one or more changes to a loan balance; and
    comparing one or more effects of the plurality of distinct loan payment options based at least in part on two or more payment amounts associated with the plurality of distinct loan payment options.

2. The method of claim 1, wherein the two or more payment amounts include at least a first payment associated with an initial term and a second payment associated with a subsequent term.

3. The method of claim 1, wherein the two or more payment amounts change over time.

4. The method of claim 1, wherein the two or more payment amounts are calculated based at least in part on a loan amount, a fixed interest rate, and a minimum payment rate.

5. The method of claim 4, wherein the two or more payment amounts are calculated based at least in part on an earlier payment rate.

6. The method of claim 1, further comprising presenting constraint amounts for a period of time for one of the two or more payment amounts until a final payment amount is obtained.

7. The method of claim 6, wherein the constraint amounts comprise a period in which the two or more payment amounts are held constant or a recast period after which the two or more payment amounts are adjusted based on a recast of the loan to reflect an amount of deferred interest.

8. The method of claim 1, wherein at least two of the plurality of distinct loan payment options are associated with disparate loan terms.

9. The method of claim 1, further comprising presenting trend information for a duration of the loan period relating to the two or more payment amounts including payment amounts, deferred interest, and the loan balance.

10. A system that presents information associated with a loan with multiple payment options, comprising:
    at least one processor coupled to a memory, the processor executing instructions associated with:
    a presentation that provides information about conventional monthly payments associated with the loan and alternative payments associated with the loan including a number of alternative payments per year, and constraint amounts for a period of time for the alternative payment amounts until a final payment amount is obtained, wherein the presentation includes at least a comparison tabulation that compares at least one effect of the alternative payments with the conventional monthly payments over time and includes at least at least an amount of deferred interest and one or more changes to a loan balance; and
    a presenter component that determines the conventional monthly payments and the alternative payments based at least in part on numerical data associated with the loan.

11. The method of claim 1, wherein the plurality of distinct loan payment options are presented with different periods of time for the loan.

12. The system of claim 10, wherein the alternative payments change over time.

13. The system of claim 10, wherein the alternative payments are calculated based at least in part on a loan amount, a fixed interest rate, and a alternative payment rate.

14. The system of claim 10, wherein the presentation comprises a graph of the alternative payments and the conventional monthly payments.

15. The system of claim 10, wherein the constraint amounts comprise a period in which the alternative payments are held constant or a recast period after which the alternative payments are adjusted based on a recast of the loan to reflect an amount of deferred interest.

16. The system of claim 10, wherein the presentation trend information for a duration of the loan period relating to the alternative payment amount including payment amount, deferred interest, and loan balance.

17. A system that presents an existing loan with multiple payment options, comprising:
    at least one processor coupled to a memory, the processor executing instructions associated with:
    means for selecting a number of annual payments associated with a set of alternative payments;
    means for determining a set of interest-based monthly payments and the set of alternative payments with at least one new loan structure for the existing loan, based at least in part on an amount of the existing loan, a fixed interest rate of the existing loan, and an alternative payment rate;
    means for exporting the set of interest-based monthly payments and the set of alternative payments; and
    means for presenting the set of interest-based monthly payments and the set of alternative payments with at least a comparison tabulation including an amount of deferred interest and one or more changes to a loan balance;
    wherein the means for presenting displays a comparison of the set of interest-based monthly payments with the set of alternative payments, the comparison includes at least one effect of the alternative payments in relation to the existing loan; and wherein the means for presenting displays trend information for a duration of a loan period relating to the alternative payment amount including payment amount, deferred interest, and loan balance.

18. The system of claim 10, wherein the alternative payments are selected by a lender.

19. The system of claim 10, wherein the alternative payments are selected by a borrower.

20. The system of claim 10, wherein the number of alternative payments per year is selected by a borrower.

* * * * *